US008639562B2

(12) United States Patent
Vargas-Magana et al.

(10) Patent No.: US 8,639,562 B2
(45) Date of Patent: Jan. 28, 2014

(54) COST ENTITY MATCHING

(75) Inventors: Marcos Cesar Vargas-Magana, San Pedro Zacatenco (MX); Cipriano A. Santos, Modesto, CA (US); Carlos Valencia, Mexico (MX); Lyle H. Ramshaw, Palo Alto, CA (US); Robert E. Tarjan, Princeton, NJ (US); Ivan Lopez-Sanchez, Sonora (MX); Maria Teresa Gonzalez Diaz, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/456,610

(22) Filed: Apr. 26, 2012

(65) Prior Publication Data

US 2013/0290049 A1 Oct. 31, 2013

(51) Int. Cl.
*G06Q 10/00* (2012.01)

(52) U.S. Cl.
USPC ........................................................ 705/7.36

(58) Field of Classification Search
USPC ........................................................ 705/7.36
See application file for complete search history.

(56) References Cited

U.S. PATENT DOCUMENTS

| 7,885,846 B2 | 2/2011 | An et al. |
| 7,991,633 B2 | 8/2011 | Baker et al. |
| 2008/0103868 A1 | 5/2008 | Santos et al. |
| 2008/0271022 A1* | 10/2008 | Strassner et al. ............. 718/100 |
| 2009/0132306 A1 | 5/2009 | Dierking |
| 2009/0138312 A1 | 5/2009 | Moll et al. |
| 2011/0202382 A1 | 8/2011 | Santos et al. |
| 2011/0231215 A1* | 9/2011 | Santos et al. ................ 705/7.12 |
| 2012/0016710 A1 | 1/2012 | Santos et al. |

OTHER PUBLICATIONS

Ahuja, et al. "Improved Algorithms for Bipartite Network Flow." SIAM Comput., vol. 23, No. 5, pp. 906-933, Oct. 1994.*
Bus, Libor. "Auction Algorithms for Large Dense Assignment Problems." A thesis submitted to the Faculty of Electrical Engineering, Czech Technical University in Prague, Feb. 2008.*
Morris, et al. "Construction of Bipartite and Unipartite Weighted Networks from Collections of Journal Papers." Oklahoma State University, Feb. 2, 2008.*
Morris, Steven Allen. "Unified Mathmatical Treatment of Complex Cascaded Bipartite Networks: The Case of Collections of Journal Papers." Submitted to the Faculty of the Graduate College of the Oklahoma State University in partial fulfillment of the requirements for the Degree of Doctor of Philosophy, May 2005.*

(Continued)

*Primary Examiner* — Susanna M Meinecke Diaz

(57) ABSTRACT

A method for cost entity matching can include constructing a first graph including a number of first entities and a number of second entities, and assigning a number of first cost values to each of a number of first edges connecting one of the number of first entities to one of the number of second entities in the first graph; adding a second graph to the first graph, wherein the second graph includes the number of first entities and the number of second entities, and assigning a second cost value to each of a number of second edges connecting one of the number of first entities in the first graph to the corresponding first entity in the second graph; and, matching each one of the number of second entities to one of the number of first entities based on the number of first cost values and the second cost values.

13 Claims, 5 Drawing Sheets

(56) References Cited

OTHER PUBLICATIONS

Archived definition of "Adjacency matrix" retrieved from [URL: http://web.archive.org/web/20110913104008/http://en.wikipedia.org/wiki/Adjacency_matrix], archived on Sep. 13, 2011.*
Archived definition of "Graph theory" retrieved from [URL: http://web.archive.org/web/20110914175503/http://en.wikipedia.org/wiki/Graph_theory], archived on Sep. 14, 2011.*
Wang, "A Review of Operations Research Applications in Workforce Planning and Potential Modeling of Military Training," Feb. 2005, 37 pages.
Gonzalez-Diaz, et al., "Determining Work Placement Preferences," U.S. Appl. No. 13/088,161, filed Apr. 15, 2011, 51 pages.
Santos, et al., "Resource Planning Using Full Time Equivalents," PCT Application Serial No. PCT/US2011/028151, Filed Mar. 11, 2011, 37 pages.

* cited by examiner

COST ENTITY MATCHING

BACKGROUND

With the rising ability and use of computers, enterprises are increasingly utilizing organizational management systems to manage activities within the enterprise. An organizational management system, such as an entity planning system, can integrate various enterprise operations into a single system. For example, an entity planning system can be used to match available entities within an enterprise.

DETAILED DESCRIPTION

Figure 1:
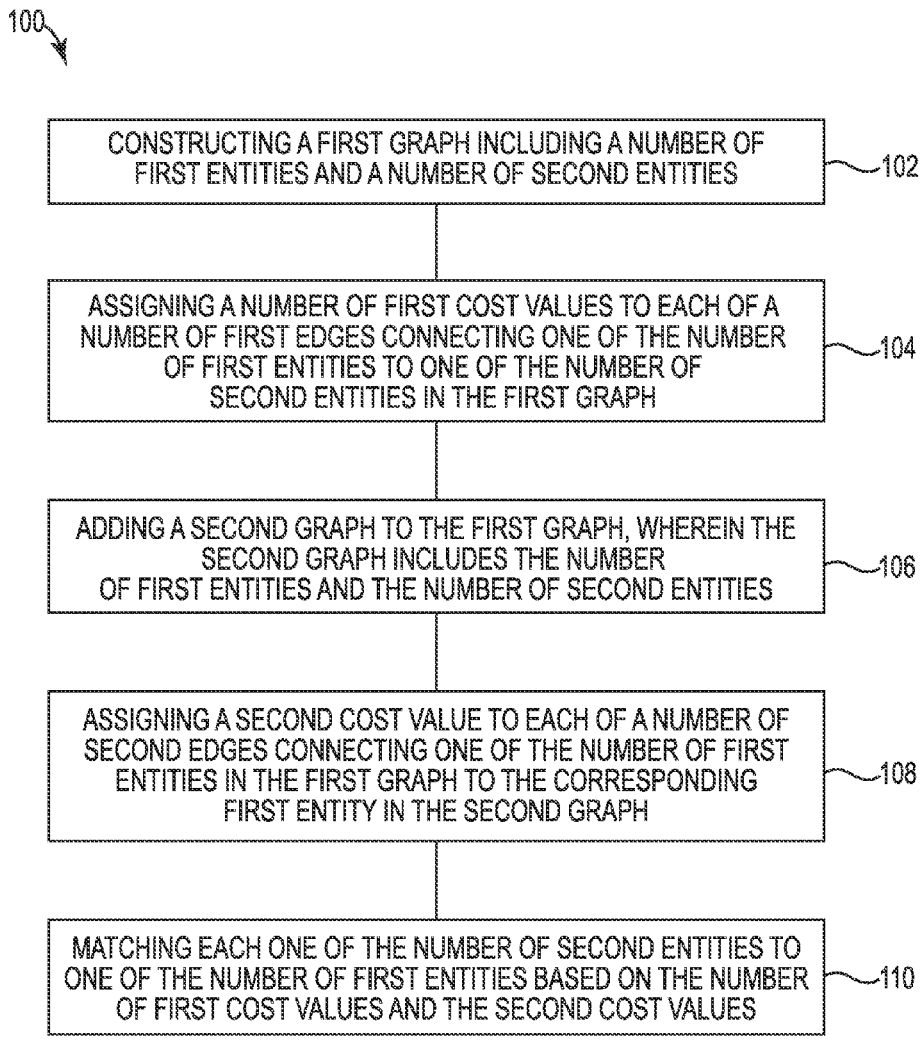
FIG. 1 is a block diagram illustrating an example of a method for cost entity matching according to the present disclosure.

Examples of the present disclosure may include methods, systems, and computer-readable and executable instructions and/or logic. An example method for cost entity matching can include constructing a first graph including a number of first entities and a number of second entities, and assigning a number of first cost values to each of a number of first edges connecting one of the number of first entities to one of the number of second entities in the first graph. An example method for cost entity matching can include adding a second graph to the first graph, wherein the second graph includes the number of first entities and the number of second entities, assigning a second cost value to each of a number of second edges connecting one of the number of first entities in the first graph to the corresponding first entity in the second graph, and matching each one of the number of second entities to one of the number of first entities based on the number of first cost values and the second cost values.

Allocating entities (e.g., resources) within an enterprise through entity planning can increase the profitability of the enterprise. Enterprises, such as a business, can annually spend large quantities of money to hire resource managers and planners to identify, prevent, and address current and future gaps to match entities, such as matching human resources to available jobs. Organizational management systems, such as an entity planning system, within an enterprise can allow an enterprise to efficiently allocate entities.

Cost entity matching can determine the lowest cost to match entities by considering the cost of matching each of the entities. For example, a human resource can be matched to an available job by considering the capability of the human resource and the job requirements, the availability of the human resource, the training cost, and hiring policies. Cost entity matching can match demand entities to supply entities across an entire enterprise, which can lower the operating cost of operating an enterprise as compared to matching entities in an ad-hoc and/or decentralized manner.

For instance, in various examples of the present disclosure a method for cost entity matching can match human resources to available jobs of an entity by considering the cost of the potential matches. An example method for cost matching human resources to available jobs can include constructing a first graph including a number of human resources and a number of available jobs, and assigning a number of first cost values to each of a number of first edges connecting one of the number of human resources to an available job in the first graph. Each of the number of first edges can represent a potential match of the human resource to an available job, for example. The first cost values assigned to each of the number of first edges, for instance, can represent the cost of matching the human resource to the available job. For example, the cost can include the cost of hiring a new human resource, the cost of training an employee, and the cost of using a qualified employee, among many others.

An example method for cost matching of human resources to available jobs can include adding a second graph to the first graph, wherein the second graph includes the number of human resources and the number of available jobs and assigning a second cost value to each of a number of second edges connecting one of the number of human resources in the first graph to the corresponding human resource (e.g., the identical copy) in the second graph. For instance, the second graph can include a mirror image of the first graph including the number of first edges, and the number of second edges can each be assigned an identical default value. An example method for cost matching human resources to available jobs can include matching each one of the number of available jobs to one of the number of human resources based on the number of first cost values and the second cost values. For instance, each available job can be matched to one human resource based on applying a function to the first cost values (e.g., costs associated with the potential matches of human resources to available jobs) and the second cost values (e.g., the identical default values).

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and the process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 214 may reference element "14" in FIG. 2, and a similar element may be referenced as 414 in FIG. 4. As will be appreciated, elements shown in the various examples herein can be added, exchanged, and/or eliminated so as to provide a number of additional examples of the present disclosure.

In addition, as will be appreciated, the proportion and the relative scale of the elements provided in the figures are intended to illustrate the examples of the present disclosure, and should not be taken in a limiting sense. As used herein, the designators "N", "P," and "R" particularly with respect to reference numerals in the drawings, indicates that a number of the particular feature so designated can be included with a number of examples of the present disclosure. Also, as used herein, "a number of" an element and/or feature can refer to one or more of such elements and/or features.

FIG. 1 is a block diagram illustrating an example of a method 100 for cost entity matching according to the present disclosure. The method 100 can determine a lowest sum cost to match each one of a number of second entities to one of a number of first entities.

The method 100 can be performed by a computing device (e.g., a computing device having a processing resource that can be in communication with, and/or receive a tangible non-transitory computer-readable medium storing a set of computer-readable instructions executable by the processing resource). For example, a computing device can include a computing system containing a number of computing devices.

At 102, a first graph including a number of first entities and a number of second entities can be constructed. The first graph can include a graph and a first portion of a graph, for example. For instance, the number of first entities and the number of second entities can be from a dataset. The dataset can include an enterprise dataset of entities. The number of first entities can include a number of human resources, a number of houses, and/or a number of supply entities, among many others. A number of human resources, for instance, can include a number of qualified employees, a number of trainable employees, a number of allowed hires, and/or a number of gaps that can be assigned to a job. For example, a supply entity can include women and/or men.

The number of second entities can include a number of jobs, a number of potential buyers, and/or a number of demand entities, for example. A demand entity can include men and/or women, for instance. A number of jobs, for example, can include a number of jobs that an enterprise has a need to assign a human resource to. For instance, an enterprise can include a business, an organization, a company, among many others. A job can include a task, a project, and/or a promotion, among many others. For example, the method 100 can determine the lower cost of allocating an existing employee verses hiring a new employee for a promotion.

At 104, a number of first cost values can be assigned to each of a number of first edges connecting one of the number of first entities to one of the number of second entities in the first graph. The number of first edges can include a number of potential matching edges, for instance. Each of the potential matching edges can include a representation of an available match of the respective first entity connected to the respective second entity and the potential matching edges can connect a first entity node to a second entity node in the first graph, for example. An available match can include a first entity that is capable of matching a second entity. For example, Bob the human resource (e.g., first entity) with the capability of being matched to Job 1 (e.g., second entity) can have a first cost value assigned to a potential matching edge (e.g., first edge) connecting Bob to Job 1. In some examples, the potential matching edges may be added to the first graph. A first entity may be connected to a second entity with a potential matching edge in response to determining the first entity and the second entity has a first cost value, for example.

The first cost value can represent the cost of matching the first entity to the second entity. For example, a first cost value of matching Bob to Job 1 may be lower if Bob is qualified to perform Job 1 than if Bob must be trained to perform Job 1.

In various examples of the present disclosure, a first entity among the number of first entities can include a gap entity. A gap entity can include a representation of a shortage of first entities. For instance, a job (e.g., second entity) may not have a human resource (e.g., first entity) that is qualified to do the job and can be connected to a gap first entity. A shortage of human resources qualified to perform available jobs can be represented on the first graph by a gap entity, for example. A first cost value for a potential matching edge among the number of potential matching edges connecting a gap first entity to one of the number of second entities can include a cost value of filling the shortage of first entities. For example, the first cost of filling a human resource shortage for a job requiring a high amount of skill can be higher than the first cost of filing a human resource shortage for a job requiring a low amount of skill.

In some examples of the present disclosure, the cost of entity matching (CEM) of the first graph and first cost values can be defined as CEM=(X∪Y, E) with a weight function c: E→Z. For example, X can denote the number of human resources (e.g., first entities), Y can denote the number of jobs (e.g., second entities), E can denote the number of potential matching edges (e.g., first edges), and c can denote the number of first cost values (e.g., the cost of matching a human resource x to a job y.) The human resources can be partitioned into four subsets: a set of employees that are qualified to perform a job W⊂X, a set of employees that can be trained to be qualified to perform a job WT⊂X, a set of human resources that can be hired to perform a job H⊂X, and a set of gaps to perform a job G⊂X. For example, W can denote employees that are qualified, WT can denote employees that can be trained to be qualified, H can denote human resources that can be hired, and G can denote gaps.

For each job (e.g. second entity) there is a possibility that the job cannot be filled, and the set of gaps to perform a job G⊂X can be defined as, G=Y. Thus, the number of gap first entities can be equal to the number of second entities.

The set of human resources that can be hired to perform a job, H⊂X, can be limited. For example, a company may limit the number of new hires that can be hired for a job. If there is a limit, hlim, on the number of human resources that can be hired, then the set of human resources that can be hired to perform a job H⊂X can equal the respective limit, |H|=hlim. If there is no limit on the number of people to hire, then the set of human resources that can be hired to perform a job can be defined as, H=Y.

A first cost value can be assigned to each of the potential matching edges E in the first graph for each of the four subsets of human resources. An employee x qualified for job y can have a defined potential matching edge of (x,y)∈E. An employee x that can be trained for job y can have a defined potential matching edge of (x,y)∈E. A human resource h that can be hired for job y can have a defined potential matching edge of (h, y)∈E. A gap resource g that is required to fill a gap of job y can have a defined potential matching edge of (g,y) ∈E.

For example, the calculated cost value c(x,y), associated with each of the potential matching edges can be based on the matching score of a qualified employee x for a job y, penalties associated to training an employee x for a job y, penalties of hiring a human resource h for a job y, and penalties associated with required a resource to fill a gap g for job y. The penalties of the first cost values can be based on the start time of the job, the availability of the human resource, the human resource's obligations to on-going jobs, training time, and hiring lead times, among others.

In various examples of the present disclosure, the number of first entities (e.g., human resources), N, can be greater than or equal to the number of second entities (e.g. jobs), P, such that N=|X|≤|Y|=P.

At 106, a second graph can be added to the first graph, wherein the second graph includes the number of first entities and the number of second entities. The second graph can include a mirrored graph (e.g., mirror image of the first graph)

and a second portion of a graph, for example. The second graph can be constructed below the first graph, for instance. The second graph, for instance, can include a number of potential matching edges (e.g. first edges) connecting the number of first entities and the number of second entities in the second graph. The number of potential matching edges in the second graph can include an identical copy, mirrored copy, and/or mirror image of the number of potential matching edges in the first graph, for example.

At 108, a second cost value can be assigned to each of a number of second edges connecting one of the number of first entities in the first graph to a corresponding first entity in the second graph. The second edges, for instance, can include linking edges that link the first entities in the first graph to the first entities in the second graph. For example, the linking edges can connect one of the number of first entity nodes in the graph to the respective first entity node in the mirrored graph and can connect a first entity among the number of first entities in the first portion of a graph to a respective mirror image of the first entity in the second portion of the graph. The second cost value can include an identical value, such as a default value, assigned to each of the number of linking edges. For example, a default value can include zero. In some examples of the present disclosure, the number of linking edges can be added to the graph.

The first graph and second graph are a graphical representation of the number of first entities and the number of second entities. However, "constructing a first graph" and "adding [and/or constructing] a second graph", as used herein, do not require that a physical or graphical representation of the information actually exists. Rather, such a graph can be represented as a data structure in a tangible medium (e.g., in memory of a computing system). Nevertheless, reference and discussing herein may be made to the graphical representation, which can help the reader to visualize and aid in understanding a number of examples of the present disclosure.

At 110, each one of the number of second entities can be matched to one of the number of first entities based on the number of first cost values and the second cost values. For example, the match can be made based on a lowest cost of the plurality of first cost values and the second cost values. The lowest cost can include a lowest sum cost of the number of first cost values and the second cost values. For example, the lowest sum cost can be determined by applying an epsilon-scaling forward-auction function or a cost-scaling preflow-push function to the number of first cost values and the number of second cost values. A function, for example, can include an algorithm and/or a method.

The function, for instance, may require that an equal number of first entities and second entities exist to determine perfect matching of the first entities to the second entities. Perfect matching, for example, can include a match of each of the second entities to one of the first entities (e.g., matching all vertices of a graph). The method 100 can create a data structure and/or graph with equal numbers of entities on each side (e.g., vertex set, left and right, X and Y) of the data structure and/or graph when the starting dataset and/or graph (e.g., first graph) does not have equal numbers of first entities and second entities (e.g., N>P). For example, the method 100 can determine a matching of each of the number of second entities to one of the number of first entities, wherein the number of first entities is greater than the number of second entities (e.g., five first entities and two second entities).

Figure 2:
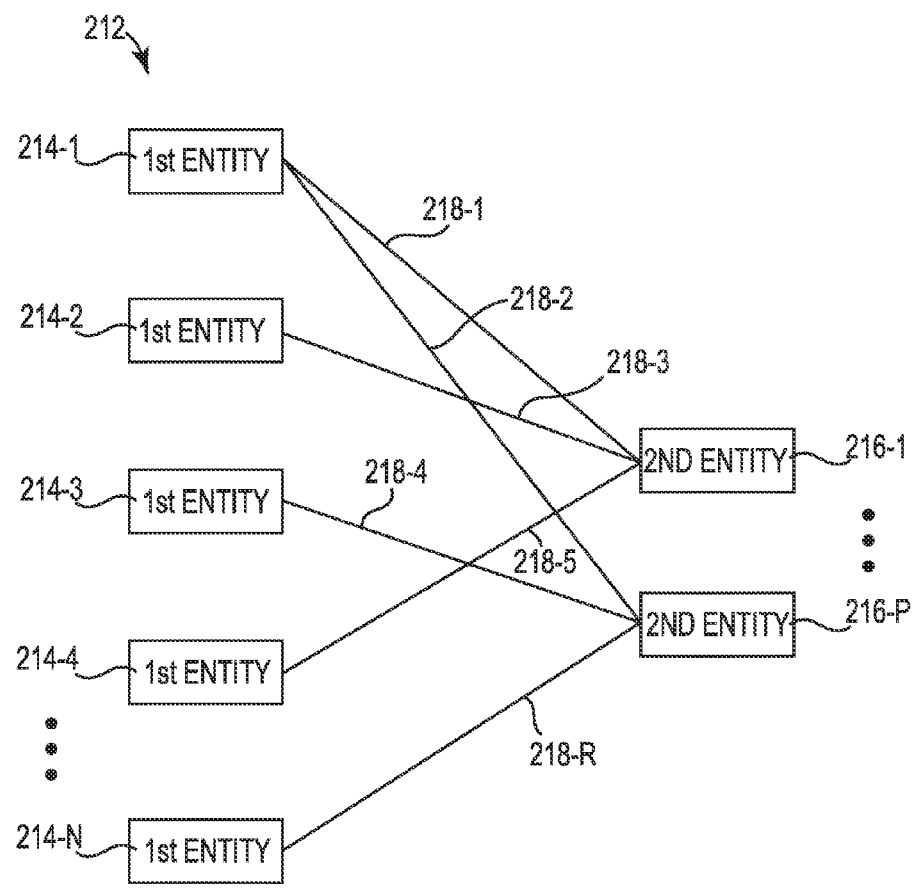
FIG. 2 illustrates an example of a cost entity matching (CEM) graph according to the present disclosure.

FIG. 2 illustrates an example of a cost entity matching (CEM) graph 212 according to the present disclosure. The CEM graph 212 in FIG. 2 can include a first graph, a first portion of a graph, and/or a graph, for example. A first graph 212 can include a bipartite graph, for example. A bipartite graph can include a graph with two independent disjoint sets (e.g. first entities and second entities, human resources and open jobs, houses and potential buyers, women and men, men and women, and supply entities and demand entities).

The first graph 212 can include a number of first entities 214-1, 214-2, 214-3, 214-4, . . . 214-N (generally 214) and a number of second entities 216-1 . . . 216-P (generally 216). The first entities 214 and the second entities 216 are collectively referred to as nodes in the first graph 212. The first entities 214 and the second entities 216 can be unique (e.g., the first graph 212 does not include more than one entry per first entity 214 or domain 216). The first graph 212 can include a number of first edges 218-1, 218-2, 218-3, 218-4, 218-5 . . . 218-R (generally 218) connecting one of the number of the first entities 214 to one of the number of second entities 216. The number of first edges 218 can include a number of potential matching edges, for example. A potential matching edge 218 can represent an available match of the respective first entity to the respective second entity. For example, the potential matching edge 218-1 represents an available match of the first entity 214-1 to the second entity 216-1.

The first graph 212 may have overlaps between different first entities 214 and second entities 216 (e.g., both the first entity 214-1 and first entity 214-2 have an available match to second entity 216-1). The order in which a first entity 214 is available to match the various second entities 216 can be irrelevant to the first graph 212.

The first graph 212 illustrated in FIG. 2 may be a scaled down version of what an actual first graph 212 might look like in practice. For example, a first graph 212 generated can have N first entities and P second entities, wherein N is 1,200 and P is 800.

Figure 3A:
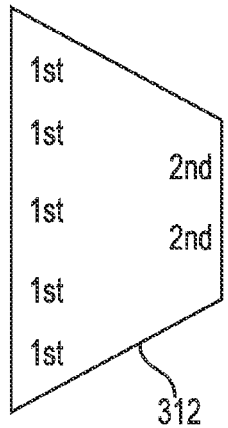
FIGS. 3A-3B illustrate examples of a CEM graph according to the present disclosure.
Figure 3B:
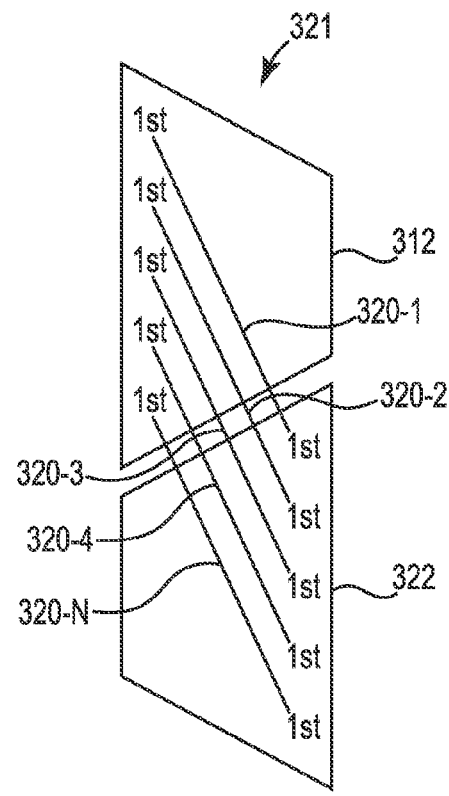

FIGS. 3A-3B illustrate examples of a CEM graph 312, 321 according to the present disclosure. For example, the CEM graph 312 of FIG. 3A can include a first graph 312 and the CEM graph 321 of FIG. 3B can include a total graph 321, wherein the total graph 321 can include a first graph 312 and a second graph 322.

As shown in FIGS. 3A and 3B, a second graph 322 can be added to a first graph 312. The second graph 322 can include the number of first entities and the number of second entities of the first graph 312. The second graph 322 can include a mirrored graph of the first graph 312, and a constructed second portion of the first graph 312, for example. The second graph 322 can be constructed by making a mirror image copy of the first graph 312, for instance. The second graph 322, for example, can be constructed under the first graph 312, placed under the first graph 312, and/or the first graph 312 can be placed above the second graph 322, although the layout is not so limited as constructing a graph does not require that a physical or graphical representation of the information actually exists. Rather, such a graph 312, 321, 322 can be represented as a data structure in a tangible medium. The second graph 322, for example, can include a mirror image of the number potential matching edge (e.g., first edges) in the first graph 312.

In various examples of the present disclosure, the second graph 322 can be created by executable instructions defining the first graph 312 as:

$$X=\{v_1, \ldots v_n\} \text{ and } Y=\{w_1, \ldots w_p\}, \text{ where } N \geq P$$

Wherein $\{v_1, \ldots v_n\}$ represents the number of first entities (e.g., human resources), $\{w_1, \ldots w_p\}$ represents the number of second entities (e.g. jobs), and the number, N, of first entities is greater than or equal to the number, P, of second entities.

An identical copy of the first graph 312 can be created. To construct an identical copy of the first graph 312, a copy of X and Y of the first graph 312 can be created and/or defined as:

$$X^C = \{v'_1, \ldots v'_N\} \text{ and } Y^C = \{w'_1, \ldots w'_P\}$$

Where $X^C$ and $Y^C$ can include an identical copy of X and Y. An identical copy can include the number of first entities and the number of second entities of the first graph 312. The cost entity matching (CEM) of the first graph 312 can be defined as CEM=(X∪Y, E) with a weight function c: E→Z. Each of the potential matching edge E (e.g. first edges) of the first graph 312 can be identical to a potential matching edge E' of the identical copy of the first graph, E'=E. The first cost value, c (v,w), assigned to each of the potential matching edges, E, of the first graph 312 can be duplicated at the potential matching edges, E', of the identical copy of the first graph. Thereby, for each of the potential matching edges on the identical copy of the first graph, v w∈E, the first cost values can equal the first cost values of the first graph 312, c'(v, w)=c(v,w).

The identical copy of the first graph 312 can be mirrored to construct the second graph 322. Constructing a second graph 322 (e.g., mirror image of the first graph 312, mirrored graph, and second portion of a graph) of the identical copy of the first graph 312 can include executable instructions to change the $X^C$ values, $\{v'_1, \ldots v'_N\}$, to Y' values, and change the $Y^C$ values, $\{w'_1, \ldots w'P\}$, to X' values. For example:

$$X' = X \cup Y^C \text{ and } Y' = Y \cup X^C$$

For each first entity $v_i$ connected by a potential matching edge E' to the second entity $w_j$ on the second graph 312, the potential matching edge E' of the identical copy of the first graph can be converted to a mirrored potential matching edge. For example, for each $v_i$ connected by a potential matching edge E' to a $w_j$ convert:

$$E' = E' \cup (w_j', v_i')$$

The first cost values, c', of the second graph 322, can be equal to the first cost values of the first graph 312, c. Thus:

$$c'(w_j', v_i') = c(v_i, w_j)$$

A number of second edges 320-1, 320-2, 320-3, 320-4 . . . 320-N (generally 320) can be added. The number of second edges 320 can include a number of linking edges, for example. The number of linking edges (e.g., second edges) can connect the first graph 312 to the second graph 322, connect the first portion of the graph 312 to the second portion of the graph 322, and connect the graph 312 to the mirrored graph 322, for example. Each of the linking edges 320 can connect one of the number of first entities to the corresponding first entity in the second graph 322. The corresponding first entity in the second graph 322 can include an identical copy of the first entity in the first graph 312, for example.

The linking edges 320 can be added to the total graph 321, including the first graph 312 and the second graph 322, by adding a linking edge E' connecting each first entity, $v_i$, in the first graph 312 to the corresponding first entity, $v_i'$, in the second graph 322. For example, for each $v_i \in X$:

$$E' = E' \cup (v_i, v_i')$$

Wherein the linking edge 320 connects the first entity $v_i$ in the first graph 312 to the first entity, $v_i'$, in the second graph 322. For example, the first entity $v_i$ can be an X value and the first entity $v_i'$ can be a Y value on the total graph 321. The total graph 321 can include the first graph 312 and the second graph 322 with the potential matching edges and the linking edges 320, for example.

Each of the linking edges 320 can be assigned a second cost value. The second cost value can include an identical constant value, k, assigned to each of the number of linking edges 320. For example, a constant value, k, can include a default value. A default value can include zero, for instance. The second cost value c' for each linking edge E' can be defined as:

$$c'(v_i, v_i') = k$$

Thus, the CEM of the second graph 322 can be defined as CEM'=(X'∪Y', E') with a weight function c': E'→Z.

Adding the second graph 322 including the number of mirrored potential matching edges (e.g., first edges) and the number of linking edges (e.g., second edges) can be defined in pseudo-code as:

1. Create a copy of X, defined as $X^C = \{v'_1, \ldots v'_N\}$, and a copy of Y, defined as $Y^C = \{w'_1, \ldots w'_P\}$
//Consider the first graph CEM=(X∪Y, E), c: E→Z.
2. E': =E
3. For each v w∈E' do
4. c' (v, w): =c (v,w).
5. End
//Consider the duplicate of the first graph
6. For each $v_i \in X$ do
7. For each $w_j \in Y$ neighbor of $v_i$ do
8. E'=E'∪(w'_j, v'_i)
9. c'(w'_j, v'_i)=c($v_i$, $w_j$)
10. End
11. End
//Consider linking edges with a common constant k
12. For each $v_i \in X$ do
13. E'=E'∪($v_i, v_i'$)
14. c'($v_i, v_i'$)=k
15. End
//Return the s-doubling transformation of the graph
//where $X' = X \cup Y^C$ and $Y' = Y \cup X^C$
16. Return {CEM'=(X'∪Y', E') with a weight function c': E'→Z}

Pseudocode can include an informal high-level description of the operating principle of a computer-readable medium that can be read by a human resource. For example, pseudocode can be used to understand a function (e.g., an algorithm) and can be translated into computer-readable medium.

In some examples of the present disclosure the number of first entities of the first graph 312, N, can be compared to the number of second entities of the first graph 312, P. In response to determining the number of first entities is greater than the number of second entities (e.g., N>P), the second graph 322 can be constructed and the second cost values can be assigned to each of the number of linking edges 320. In response to the number of first entities being equal to the number of second entities (e.g., N=P), the second graph 322 may not be constructed and/or a constructed second graph may be removed (e.g., removed from a data structure in tangible medium), and a match of each of the number of second entities to one of the number of first entities with the lowest sum of the first cost values based on a function can be determined.

Figure 4:
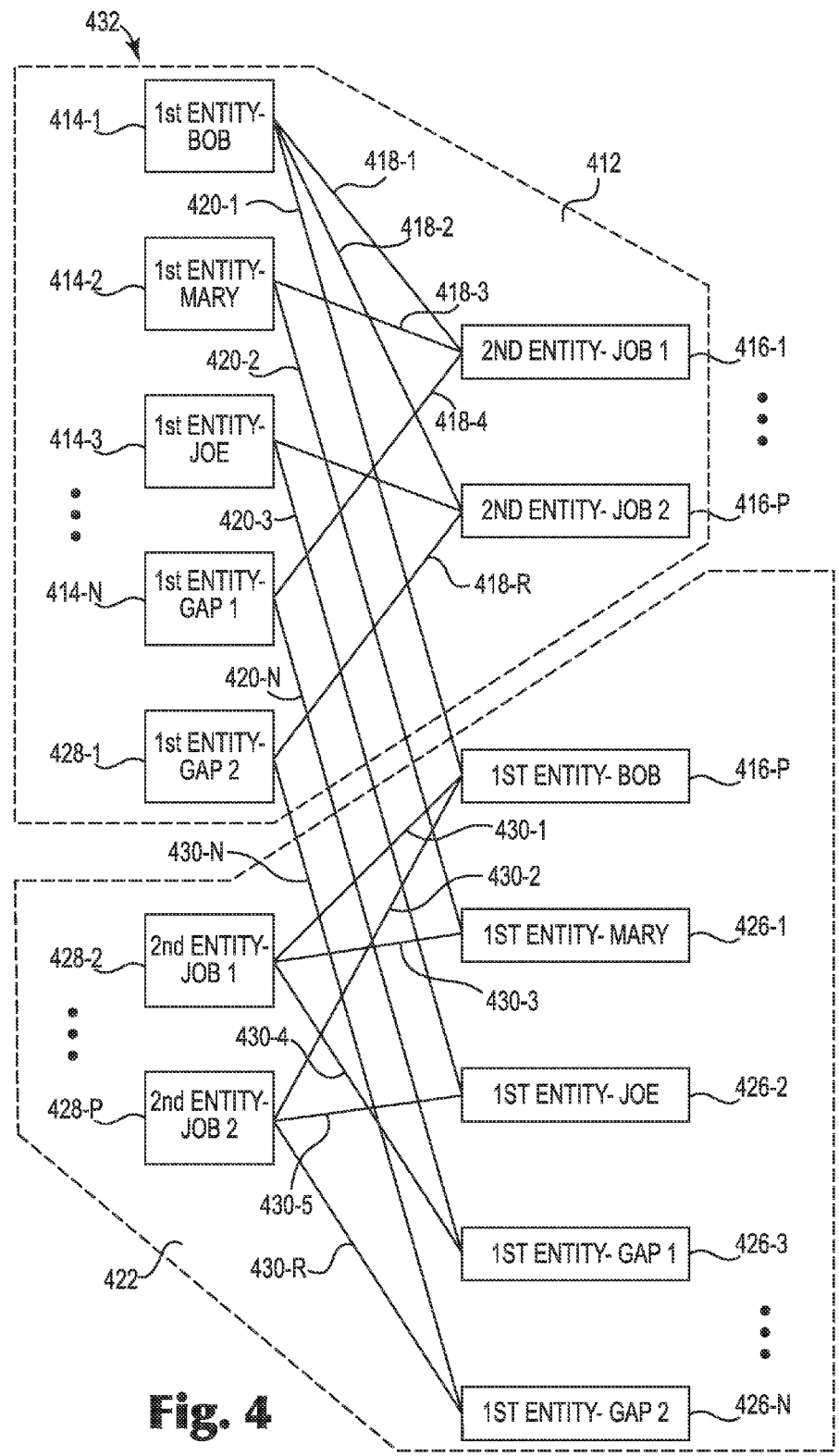
FIG. 4 illustrates an example of a CEM graph according to the present disclosure.

FIG. 4 illustrates an example of a CEM graph 432 according to the present disclosure.

The CEM graph 432 in FIG. 4 can include a graph 432 with a number of first edges 418-1, 418-2, 418-3, 418-4, 418-5 . . . -R, 430-1, 430-2, 430-3, 430-4, 430-5 . . . 430-R (generally 418 and 430) and a number of second edges 420-1, 420-2, 420-3, 420-4 . . . 420-N (generally 420). For example, the first edges 418, 430 can include potential matching edges and the second edges 420 can include linking edges. The graph 432 can include a first graph 412 and a second graph 422, a graph 412 and a mirrored graph 422, a graph 432 including a first portion of the graph 412 and a second portion of the graph 422, and a total graph 432, for example. For example, the graph 432 can include a balanced weighted bipartite graph. The graph 432 can be defined as:

$$B=(X \cup Y, E) \text{ with a weight function } c: E \rightarrow Z, \text{ where}$$
$$N=|X|=|Y|$$

Wherein X can denote the number of first entities 414-1, 414-2, 414-3, 414-4 . . . 414-N (generally 414) from the first graph 412 and the number of second entities 428-1 . . . 428-P (generally 428) from the second graph 422. Y can denote the number of second entities 416-1 . . . 416-P (generally 416) from the first graph 412 and the number of first entities 426-1, 426-2, 426-3, 426-4 . . . 426-N (generally 426) from the second graph 422. E can denote the number of potential matching edges (e.g., first edges) 418 in the first graph 412, the number of copies of the potential matching edges 430 in the second graph 422, and the number of linking edges (e.g., second edges) 420; and, c can denote the number of first cost values assigned to the number of potential matching edges 418 in the first graph 412, the number of first cost values assigned to the number of copies of the potential matching edges 430 in the second graph 422, and the number of second cost values assigned to the number of linking edges 420.

In various examples of the present disclosure, a match of each one of the number of second entities 416, 426 to one of the number of first entities 414, 428 with a lowest cost can be determined. The lowest cost can include the lowest sum cost of the number of first cost values assigned to the potential matching edges of the first graph 418 and the potential matching edges of the second graph 430 and the second cost values assigned to the linking edges 420.

For example, the match can be determined based on applying a function to the first cost values (e.g., associated with the number of first edges/potential matching edges 418,430) and the second cost values (e.g., associated with the number of second edges/linking edges 420). A function, for example, can include an algorithm and/or a method. The function can include an epsilon-scaling forward-auction function or a cost-scaling preflow-push function, for instance. The function, for example, can associate the vertices of the graph 432 with prices to determine the lowest cost of the edges 418, 420, 430. The maximum cost C in absolute value can be assumed to be:

$$C = \underset{vw \in E}{\text{Max}}\{|c(v,w)|\}$$

The function, for example, can use a price $p_y: Y \rightarrow \Re$, that can be associated with each of the second entities (e.g. jobs). Each of the potential matching edges 418, 430 and the linking edges 420 can have a profit defined as:

$$c'(v,w)=c(v,w)-p_y(w)$$

Wherein the profit (e.g., c' (v,w)) can be determined by the cost values associated with the vertices (v, w) minus the price of the entity (e.g., $p_y(w)$).

The function can determine the lowest cost of matching $X \cup Y$ in the graph 432 by associating prices with the vertices Y, profits with the edges in X and Y, and determining the lowest sum cost in an edge by edge approach. Thus, the function can determine the lowest cost of matching the graph 432 (e.g., balanced weighted bipartite graph) including the first graph 412 and the second graph 422. For example, the function to determine the lowest cost of matching $X \cup Y$ in the graph 432 can be defined in pseudo-code as:

1. Set $\epsilon:=C$ and set $\alpha>1$ (e.g., $\alpha=7$)
//Find a matching of minimum cost as follows
2. While $\epsilon>1/N$ do
//Find matching which is at most $N*\epsilon$ of being minimum cost
3. $\epsilon:=\epsilon/\alpha$
//Destroy matching but keep prices
4. M:=Ø
5. While have uncovered vertices in X do
6. Take an uncovered vertex v∈X do
7. Let vw and vz be the edges with the smallest and second smallest profit respectively.
8. Compute the difference $\gamma=c'(v,z)-c'(v,w)>0$
9. If w is matched with v' then M: $=M-\{v'w\}$//set v' as uncovered
10.
11. M:=M∪{vw}
12. $p_y(w):=p_y(w)-\gamma-\epsilon$
13. End
14. End
//Return the resulting minimum cost matching
15. Return M Wherein M can denote the minimum cost of matching each Y to one X in the graph 432. The example pseudo-code includes an example of an epsilon-scaling forward-auction function (e.g., algorithm). For example, pseudo-code for a function to determine the lowest cost of matching $X \cup Y$ in the graph 432 can include pseudo-code that describes an epsilon-scaling forward-auction function and pseudo-code that describes a cost-scaling preflow-push function, among others.

To determine the lowest cost of matching first entities 414 and the second entities 416 of the first graph 412, the first graph 412 can be defined as:

$$CEM=(X^{CEM} \cup Y^{CEM}, E^{CEM}), c^{CEM}: E^{CEM} \rightarrow Z$$

The graph 432 containing the first graph 412 and the second graph 422 can be defined as:

$$B=(X^B \cup Y^B, E), c^B: E^B \rightarrow Z$$

The lowest cost of matching the graph 432 determined by the function can be defined at $M_B$. The lowest cost of matching $M_{CEM}$ the first entities 414 and the second entities 416 of the first graph 412 can be determined by:

$$M_{CEM}=M_B \cap E^{CEM}$$

The matching of the first graph $M_{CEM}$ can result in each of the second entities 416 in the first graph 412 being matched to only one of the first entities 414 in the first graph 412. For example, the second entity 416-1 (e.g., Job 1) can be matched to the first entity 414-1 (e.g., Bob), the first entity 414-2 (e.g., Mary), or the first entity 414-4 (e.g., Gap 1), but not more than one of the available first entities 414-1, 414-2, 414-4. Thereby, each of the second entities 416 is matched to at least one, but not more than one, first entity 414, and each first entity 414 is matched to one, or fewer (e.g. zero second entities 416), of the second entities 416.

Figure 5:
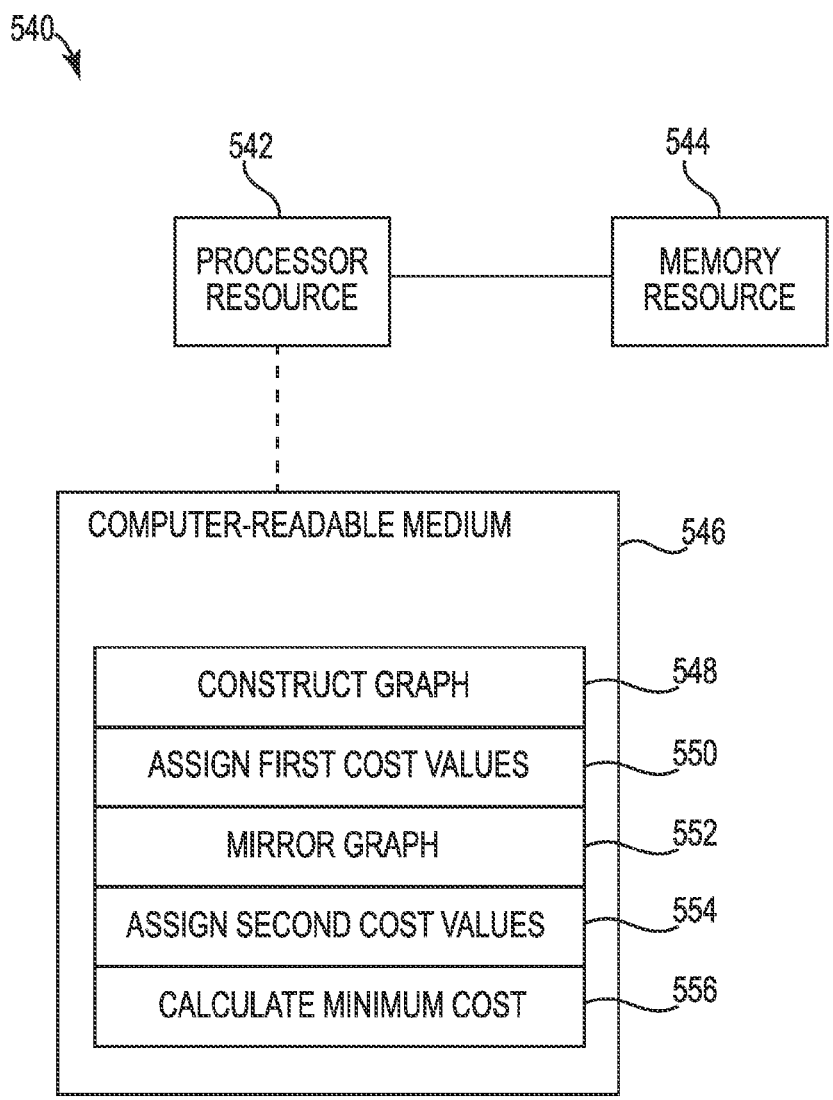
FIG. 5 is a block diagram illustrating a processing resource, a memory resource, and computer-readable medium according to the present disclosure.

FIG. 5 is a block diagram 540 illustrating a processing resource 542, a memory resource 544, and computer-readable medium 546 according to the present disclosure. The computer readable medium 546 (e.g., a tangible, non-transitory medium) and/or the memory resource 544 can store a set of instructions executable by the processing resource 542 to construct a graph 548 include a number of nodes representing a first entity and a second entity, and a number of first edges, each edge connecting one of the number of first entities to one of the number of second entities. The number of first edges, for example, can include potential matching edges. The graph can include a first portion of a graph including a number of first entities and a number of second entities from a dataset, for example. The instructions can be executed to assign a number of first cost values 550 to each of the number of potential matching edges (e.g., first edges) of the graph.

The instructions can be executed to construct a mirrored graph 552 of the graph. The mirrored graph can include a second portion of the graph under the first portion of the graph, wherein the second portion of the graph is a mirror image copy of the first portion of the graph, for example. The mirrored graph, for example, can include a mirrored copy of the number of potential matching edges in the first graph. The instructions can be executed to assign a second cost value 554 to each of a number of second edges connecting the number of first entity nodes of the graph to the respective first entity node of the mirrored graph. The number of second edges, for example, can include a number of second edges connecting a first entity among the number of first entities on the first portion of the graph to a respective mirror image of the first entity on the second portion of the graph. For instance, the number of second edges can include a number of linking edges.

The instructions can be executed to determine a match 556 of each one of the number of second entities to one of the number of first entities with a lowest cost based on the number of first cost values and the second cost values. Determining a match can include applying a function to the first cost values of the number of potential matching edges and the second cost values of the number of linking edges, for example.

The methods, techniques, systems, and apparatuses described herein may be implemented in digital electronic circuitry or computer hardware, for example, by executing instructions stored in computer-readable storage media. Apparatuses implementing these techniques may include appropriate input and output devices, a computer processor, and/or a tangible computer-readable storage medium storing instructions for execution by a processor.

A process implementing techniques disclosed herein may be performed by a processor (e.g., processing resource) executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Versatile Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and the desired results still may be achieved. Similarly, components in the disclosed systems may be combined in a different manner and/or replaced or supplemented by other components and the desired results still may be achieved.

What is claimed:

1. A computer-implemented method for cost entity matching based on execution of a set of instructions stored on a non-transitory computer-readable medium and executable by a processing resource of an entity planning system, the method comprising:
    constructing, by the processing resource, a first graph including a number of human resources and a number of jobs;
    assigning, by the processing resource, a number of first cost values to each of a number of first edges connecting one of the number of human resources to one of the number of jobs in the first graph, wherein each first cost value includes a potential cost to match one of the human resources to one of the jobs;
    adding, by the processing resource a second graph to the first graph, wherein the second graph includes a mirrored graph of the first graph including the number of entities human resources and the number of jobs;
    assigning, by the processing resource, a second cost value to each of a number of second edges connecting one of the number of human resources in the first graph to the corresponding human resource in the second graph; and
    matching, by the processing resource, each one of the number of jobs to one of the number of human resources based on the number of first cost values and the second cost values to allocate human resources to the number of jobs.

2. The method of claim 1, wherein constructing the first graph includes representing the number of human resources and the number of jobs as nodes on the first graph.

3. The method of claim 1, wherein constructing the first graph includes representing the number of human resources and the number of jobs as nodes on the first graph and wherein a first entity human resource among the number of human resources includes a gap entity, wherein the gap entity includes a representation of a shortage of human resources.

4. The method of claim 3, wherein a first cost value for a first edge among the number of first edges connecting the gap entity to one of the number of jobs includes a cost value of filling the shortage of human resources.

5. A non-transitory computer-readable medium storing a set of instructions executed by a processing resource to:
    construct a graph including a number of nodes representing a number of human resources and a number of jobs, and a number of first edges, each first edge connecting one of the number of human resource nodes to one of the number of job nodes;
    assign a number of first cost values to each of the number of first edges in the graph wherein each first cost value includes a potential cost to match one of the human resources to one of the jobs;
    construct a mirrored graph of the graph;
    add a number of second edges, each second edge connecting one of the number of the human resource nodes in the graph to a respective mirror image human resource node in the mirrored graph;
    assign a second cost value to each of the number of second edges connecting the number of human resource nodes in the graph to the respective human resource node in the mirrored graph; and
    determine a match of each one of the number of jobs to one of the number of human resource with a lowest cost based on the number of first cost values and the second cost values to allocate human resources to the number of jobs.

6. The non-transitory computer-readable medium of claim 5, wherein the instructions to assign the second cost value include instructions executable to assign an identical second cost value to each of the number of second edges.

7. The non-transitory computer-readable medium of claim 5, wherein the instructions to determine the match include instructions executable to apply a function to the first cost values of the number of first edges and the second cost values of the number of second edges to determine a lowest cost sum of matching one of the number of jobs to one of the number of human resources.

8. The non-transitory computer-readable medium of claim 5, wherein the instructions to determine the match include instructions executable to apply at least one of a epsilon scaling forward auction function and a cost scaling pre-flow push function.

9. A system for cost entity matching, comprising:
a memory resource; and
a processing resource coupled to the memory resource, to:
construct a first portion of a graph including a number of human resources and a number of jobs from an input dataset;
assign a first cost value to each of a number of first edges in the first portion of the graph,
wherein each of the number of first edges connects one of the number of human resources to one of the number of jobs, each first edge representing an available match of the respective human resource to the respective job, and wherein each first cost value includes a potential cost to match one of the human resources to one of the jobs;
construct a second portion of the graph under the first portion of the graph, wherein the second portion of the graph is a mirror image copy of the first portion of the graph;
assign a second cost value to each of a number of second edges in the graph, wherein each of the number of second edges connects a human resource among the number of human resources in the first portion of the graph to a respective mirror image of the first entity human resource in the second portion of the graph;
apply a function to the first cost values of the number of first edges and the second cost values of the number of second edges; and
determine a match of each of the number of jobs to one of the number of human resources with the lowest cost sum of the number of first cost values and the number of second cost values based on the function to allocate human resources to the number of jobs.

10. The system of claim 9, wherein the processing resource is coupled to the memory resource to compare a number of the human resources to a number of the jobs.

11. The system of claim 10, wherein the processing resource is coupled to the memory resource to construct the second portion of the graph, and assign the second cost value to each of the number of second edges in the graph in response to determining the number of the human resources is greater than the number the jobs.

12. The system of claim 10, wherein the processing resource is coupled to the memory resource to remove the second portion of the graph, and to determine a match of each of the number of jobs to one of the number of human resources with the lowest cost sum of the first cost values based on the function in response to determining the number of the human resources is identical to the number of the jobs.

13. The system of claim 9, wherein the processing resource is coupled to the memory resource to connect a human resource among the number of human resources with a first edge to a job among the number of jobs based on a determination that the human resource and the job has a first cost value.

* * * * *

UNITED STATES PATENT AND TRADEMARK OFFICE
CERTIFICATE OF CORRECTION

| | | |
|---|---|---|
| PATENT NO. | : 8,639,562 B2 | Page 1 of 1 |
| APPLICATION NO. | : 13/456610 | |
| DATED | : January 28, 2014 | |
| INVENTOR(S) | : Marcos Cesar Vargas-Magana et al. | |

It is certified that error appears in the above-identified patent and that said Letters Patent is hereby corrected as shown below:

In the Claims

In column 12, line 20, in Claim 1, before "human" delete "entities".

In column 12, line 36, in Claim 3, before "human" delete "first entity".

In column 14, line 3, in Claim 9, after "the" delete "first entity".

In column 14, line 22, in Claim 11, after "number" insert -- of --.

Signed and Sealed this
Seventeenth Day of June, 2014

Michelle K. Lee
*Deputy Director of the United States Patent and Trademark Office*